US012339350B2

(12) United States Patent
Benbouhout et al.

(10) Patent No.: US 12,339,350 B2
(45) Date of Patent: Jun. 24, 2025

(54) METHOD FOR LOCATING A COMMUNICATION DEVICE IN PROXIMITY TO A VEHICLE

(71) Applicant: Continental Automotive GmbH, Hannover (DE)

(72) Inventors: Rachid Benbouhout, Toulouse (FR); Thomas Eichstetter, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 319 days.

(21) Appl. No.: 18/081,867

(22) Filed: Dec. 15, 2022

(65) Prior Publication Data

US 2023/0194696 A1   Jun. 22, 2023

(30) Foreign Application Priority Data

Dec. 21, 2021 (FR) ........................................ 2114148

(51) Int. Cl.
*G01S 13/76* (2006.01)
*G01S 13/00* (2006.01)
*G01S 13/10* (2006.01)

(52) U.S. Cl.
CPC .......... *G01S 13/765* (2013.01); *G01S 13/003* (2013.01); *G01S 13/10* (2013.01)

(58) Field of Classification Search
CPC ....... G01S 13/765; G01S 13/003; G01S 13/10
USPC ...................................................... 342/125
See application file for complete search history.

(56) References Cited

U.S. PATENT DOCUMENTS

| 7,110,880 | B2 * | 9/2006 | Breed | G08G 1/167 |
| | | | | 340/995.13 |
| 8,787,944 | B2 * | 7/2014 | Smith | H04W 4/026 |
| | | | | 455/519 |
| 9,063,211 | B2 * | 6/2015 | Anderson | G01S 5/021 |
| 9,124,703 | B2 * | 9/2015 | Tadayon | H04W 4/029 |
| 9,148,513 | B2 * | 9/2015 | Tadayon | H04W 4/50 |
| 9,172,811 | B2 * | 10/2015 | Tadayon | H04W 4/02 |
| 9,325,850 | B2 * | 4/2016 | Tadayon | H04W 4/50 |
| 9,332,126 | B2 * | 5/2016 | Tadayon | H04M 3/53 |
| 9,338,300 | B2 * | 5/2016 | Tadayon | H04M 1/72463 |
| 9,438,737 | B2 * | 9/2016 | Tadayon | H04W 4/02 |
| 9,497,324 | B2 * | 11/2016 | Tadayon | H04L 43/16 |
| 9,513,133 | B2 * | 12/2016 | Semsey | H04W 84/12 |
| 9,538,499 | B2 * | 1/2017 | Smith | H04W 4/023 |
| 9,554,286 | B2 * | 1/2017 | Ghabra | H04L 63/108 |

(Continued)

FOREIGN PATENT DOCUMENTS

FR   3101436 A1   4/2021
WO   2014107188 A1   7/2014

OTHER PUBLICATIONS

French Search Report for French Application No. 2114148, dated Jul. 11, 2022 with translation, 13 pages.

*Primary Examiner* — Nuzhat Pervin
(74) *Attorney, Agent, or Firm* — Buchanan Ingersoll & Rooney PC

(57) ABSTRACT

A method for locating a communication device borne by a user in proximity to a vehicle in order to trigger at least one function of said vehicle, the method especially including, in a locating phase, steps of detection of a set of obstacles, called "current" obstacles, of identification of the communication device in the set of current obstacles and of location of the identified communication device among the obstacles of the set of obstacles.

10 Claims, 5 Drawing Sheets

(56) References Cited

U.S. PATENT DOCUMENTS

| | | | |
|---|---|---|---|
| 9,646,443 B2* | 5/2017 | Hamada | G07C 9/00309 |
| 9,692,902 B2* | 6/2017 | Tadayon | H04W 4/025 |
| 9,894,492 B1* | 2/2018 | Elangovan | H04W 4/023 |
| 9,894,613 B2* | 2/2018 | Scheim | G07C 9/00309 |
| 9,975,550 B2* | 5/2018 | Katoh | B60W 30/0953 |
| 10,104,499 B2* | 10/2018 | Sute | G01S 5/12 |
| 10,127,815 B2* | 11/2018 | Hernandez | G08G 1/005 |
| 10,408,917 B2* | 9/2019 | Ye | G01S 5/021 |
| 10,817,730 B2* | 10/2020 | Sakamoto | B60W 30/0956 |
| 11,474,235 B2* | 10/2022 | Niesen | H04W 4/025 |
| 11,879,967 B2* | 1/2024 | Troutman | G01S 13/878 |
| 2005/0137786 A1* | 6/2005 | Breed | B60W 30/18159 |
| | | | 701/482 |
| 2007/0254674 A1* | 11/2007 | Pedigo | H04W 8/14 |
| | | | 455/456.2 |
| 2008/0174484 A1* | 7/2008 | Katz | G08B 21/0288 |
| | | | 342/417 |
| 2011/0105097 A1* | 5/2011 | Tadayon | H04W 4/02 |
| | | | 455/418 |
| 2011/0195699 A1* | 8/2011 | Tadayon | H04B 5/77 |
| | | | 455/418 |
| 2011/0246156 A1* | 10/2011 | Zecha | G06V 40/23 |
| | | | 703/6 |
| 2012/0149341 A1* | 6/2012 | Tadayon | H04W 4/029 |
| | | | 455/412.1 |
| 2012/0214466 A1* | 8/2012 | Tadayon | H04W 4/021 |
| | | | 455/418 |
| 2012/0214467 A1* | 8/2012 | Tadayon | H04M 3/54 |
| | | | 455/418 |
| 2012/0214468 A1* | 8/2012 | Tadayon | H04W 24/08 |
| | | | 455/418 |
| 2012/0214469 A1* | 8/2012 | Tadayon | H04M 1/72463 |
| | | | 455/418 |
| 2012/0214470 A1* | 8/2012 | Tadayon | H04L 43/16 |
| | | | 455/418 |
| 2012/0214471 A1* | 8/2012 | Tadayon | H04W 4/025 |
| | | | 455/418 |
| 2012/0214472 A1* | 8/2012 | Tadayon | H04W 4/029 |
| | | | 455/418 |
| 2012/0220283 A1* | 8/2012 | Tadayon | H04M 3/54 |
| | | | 455/418 |
| 2012/0220284 A1* | 8/2012 | Tadayon | H04W 4/023 |
| | | | 455/418 |
| 2014/0330449 A1* | 11/2014 | Oman | B60R 25/245 |
| | | | 701/2 |
| 2015/0097716 A1* | 4/2015 | Wisherd | G01S 13/878 |
| | | | 342/146 |
| 2015/0185309 A1* | 7/2015 | Pu | H04W 64/003 |
| | | | 455/456.1 |
| 2016/0161605 A1* | 6/2016 | Liu | G01S 13/66 |
| | | | 342/59 |
| 2016/0227020 A1* | 8/2016 | Tadayon | H04W 4/02 |
| 2016/0227021 A1* | 8/2016 | Tadayon | H04M 3/54 |
| 2016/0363664 A1* | 12/2016 | Mindell | G01S 13/785 |
| 2017/0287332 A1* | 10/2017 | Ranninger Hernandez | B60W 30/09 |
| 2018/0170367 A1* | 6/2018 | Ohshima | B60W 50/082 |
| 2018/0239010 A1* | 8/2018 | Mindell | G01S 13/34 |
| 2018/0242105 A1* | 8/2018 | Sute | H04L 67/12 |
| 2018/0342164 A1* | 11/2018 | Golgiri | G08G 1/017 |
| 2019/0159026 A1* | 5/2019 | Rezaei | H04L 63/0853 |
| 2019/0361109 A1* | 11/2019 | Mindell | G01S 11/02 |
| 2020/0027294 A1* | 1/2020 | Schat | G07C 9/00309 |
| 2020/0134242 A1* | 4/2020 | Pugh | H04W 4/33 |
| 2020/0363524 A1* | 11/2020 | Yoon | H04W 12/069 |
| 2020/0386880 A1* | 12/2020 | Godsey | H04W 4/90 |
| 2021/0166509 A1* | 6/2021 | Stitt | H01Q 13/10 |
| 2021/0190940 A1* | 6/2021 | Troutman | G01S 13/878 |
| 2021/0358236 A1* | 11/2021 | Sekiya | H04B 17/318 |
| 2022/0039058 A1* | 2/2022 | Raj | H04W 64/006 |
| 2022/0225056 A1* | 7/2022 | Glover | H04W 4/46 |
| 2024/0085516 A1* | 3/2024 | Zamora Cadenas | H04W 4/029 |
| 2024/0310851 A1* | 9/2024 | Ebrahimi Afrouzi | A47L 9/2873 |

* cited by examiner

METHOD FOR LOCATING A COMMUNICATION DEVICE IN PROXIMITY TO A VEHICLE

CROSS REFERENCE TO RELATED APPLICATIONS

This claims priority to French Patent Application No. 2114148, filed Dec. 21, 2021, the contents of such application being incorporated by reference herein.

FIELD OF THE INVENTION

The invention relates to the automotive field and more particularly relates to a method for locating a communication device in proximity to a vehicle in order to trigger certain functions of said vehicle.

BACKGROUND OF THE INVENTION

At the present time, it is known for a motor vehicle to detect and authenticate the smart phone of a user when the latter approaches the vehicle in order, when the user is found in a predefined region around the vehicle, to trigger certain functions such as, for example, unlocking doors (here and below this term means not just the actual doors but also the trunk lid), turning on lighting or adjusting seats or air-conditioning. With this aim, a communication protocol often used in these signals used for authentication and to activate the functions is the Bluetooth® or BLE® (Bluetooth® Low Energy) protocol supported by most existing smart phones.

To remotely activate the functions of the vehicle when the user enters into the predefined region, it may be necessary to precisely locate the smart phone, to within about a few tens of centimeters, especially when the predefined region is smaller than the area of coverage of the signals. To this end, there are a plurality of prior-art solutions allowing a smart phone to be located, i.e. its position determined, in a predefined perimeter around a motor vehicle.

One solution consists in using a plurality of transceivers in the vehicle and in performing a triangulation on the signals received from the smart phone by each of the transceivers. This triangulation, which is carried out by an electronic control unit (ECU) situated on-board the vehicle, may be performed based on the times of flight or on the powers of the signals and by definition requires at least three transceivers in order to locate the smart phone, which is then found at the intersection of the three regions defined by the times of flight or the powers of the signals of each of the three transceivers.

However, in certain cases, it may turn out that only one or two transceivers are visible to the smart phone and in this case triangulation is not possible, thus preventing the smart phone from being exactly located and therefore the functions of the vehicle from being activated remotely.

At the present time, with the development of the UWB protocol (UWB standing for Ultra-WideBand), certain vehicles have begun to incorporate transceivers that use this protocol to locate smart phones with a view to managing and triggering the functions of the vehicle.

It is especially known in UWB to use a passive mode to triangulate the user bearing the smart phone, with the aforementioned drawbacks. It is also known in UWB to use an active mode in which a transceiver communicates with the smart phone using frames coded in the signals, without however being able to locate the smart phone using this active mode in the case where fewer than three transceivers are visible to the smart phone.

Therefore, there is a need for a solution allowing these drawbacks to be at least partially overcome.

SUMMARY OF THE INVENTION

To this end, a first subject of the invention is a method for locating a communication device borne by the user in proximity to a vehicle in order to trigger at least one function of said vehicle, the vehicle comprising at least two transceivers each configured to transmit and receive signals in a first mode, called the "passive" mode, in which the signals received by one of the transceivers are signals transmitted by one of the transceivers that have been reflected by an obstacle, and a second mode, called the "active" mode, in which the transceiver is configured to communicate with the communication device borne by the user, said method comprising, in a locating phase, steps of:

a.—set up of a communication in active mode between the vehicle, via at least one of the transceivers, called the "communicating" transceiver, and the communication device, b.—determination of the distance between said communicating transceiver and the communication device on the basis of the communication signals exchanged during the communication, c.—transmission of detection signals in passive mode by at least one of the transceivers, d.—detection of a set of obstacles, called "current" obstacles, on the basis of the transmitted detection signals, said set of current obstacles comprising at least the communication device borne by the user, said detection comprising determination of the distance between the vehicle and each obstacle of said set of current obstacles, e.—identification of the communication device in the set of current obstacles on the basis of the distance determined in active mode, of distances determined for the set of current obstacles in passive mode and of predetermined distances of obstacles of a predetermined set of secondary obstacles comprising the obstacles present in the environment of the vehicle before the arrival of the communication device, f.—location of the identified communication device among the obstacles of the set of obstacles on the basis of the determined distance and of the positions of the at least one transceiver that transmitted the detection signals in passive mode and of the at least one transceiver that received the detection signals reflected by the communication device in passive mode.

The method according to an aspect of the invention allows the communication device to be detected, identified and located with respect to other elements of the environment of the vehicle using both the active mode and the passive mode. The distance between the communicating transceiver and the communication device determined in active mode defines a circle centered on said communicating transceiver whereas use of the passive mode allows obstacles to be distinguished from the person bearing the communication device while defining an ellipse centered on the communicating transceiver and the transceiver that received the reflected signals, the communication device being found at the intersection of said circle and of said ellipse, on the side of the communicating transceiver and transceiver that received the reflected signals. The method according to an aspect of the invention allows the communication device to be located particularly precisely, to within a few centimeters, since its location corresponds to the intersection of a circle and of an ellipse, this for example allowing particular functions that require such a precision, such as for example vehicle-access functions (preparation of unlocking/locking of the doors and/or activation of automatic locking/unlocking of the doors below/above a threshold distance, activation of a welcome lighting sequence below a threshold distance, etc.), remote-parking functions, functions protecting against relay attacks, etc., to be triggered.

Preferably, the communication in active mode comprises sub-steps of:
- a.—transmission, by at least one of the transceivers, called the "communicating" transceiver(s), of a first communication signal in active mode to the communication device,
- b.—reception by the communication device of the transmitted first communication signal,
- c.—transmission by the communication device of a second communication signal to the communicating transceiver,
- d.—reception by the communicating transceiver of the transmitted second communication signal,
- e.—identification of the communication device.

According to one aspect of the invention, the distance is determined in active mode by computing the time, called the "time of flight", between the transmission of the first communication signal and the reception of the second communication signal by the communicating transceiver or indeed using the power or the phase of the signals received from the communication device.

Preferably, the passive mode comprises:
- a.—transmission of at least one detection signal in passive mode by each of the transceivers, comprising the identifier of said transceiver,
- b.—reflection of the at least one detection signal from at least one obstacle,
- c.—reception of the at least one reflected detection signal by at least one of the transceivers that is not the communicating transceiver.

Advantageously, the distance between the vehicle and an obstacle is computed using the time-of-flight and/or the power and/or the phase of the signals reflected from said obstacle.

According to one aspect of the invention, the method comprises a preliminary phase of determining the set of secondary obstacles, this comprising transmission of the at least one detection signal in passive mode by each of the transceivers and detection of a set of obstacles on the basis of the signals received by at least one of the transceivers in passive mode.

According to one feature of the invention, the method comprises a step of detecting the communication device in the environment of the vehicle.

Preferably, the detection comprises authentication of the communication device by the vehicle.

An aspect of the invention also relates to a computer program product, characterized in that it comprises a set of program code instructions, which, when they are executed by one or more processors, configure the one or more processors to implement a method such as described above.

An aspect of the invention also relates to an electronic control module for a motor vehicle, said electronic control module being configured to implement the method described above.

An aspect of the invention also relates to a motor vehicle comprising an electronic control unit such as described above.

An aspect of the invention also relates to a system comprising a vehicle such as described above and a communication device configured to communicate with said vehicle.

BRIEF DESCRIPTION OF THE DRAWINGS

Other features and advantages of aspects of the invention will become more clearly apparent on reading the following description. This description is purely illustrative and should be read with reference to the appended drawings, in which.

DETAILED DESCRIPTION OF THE PREFERRED EMBODIMENTS

Figure 1:
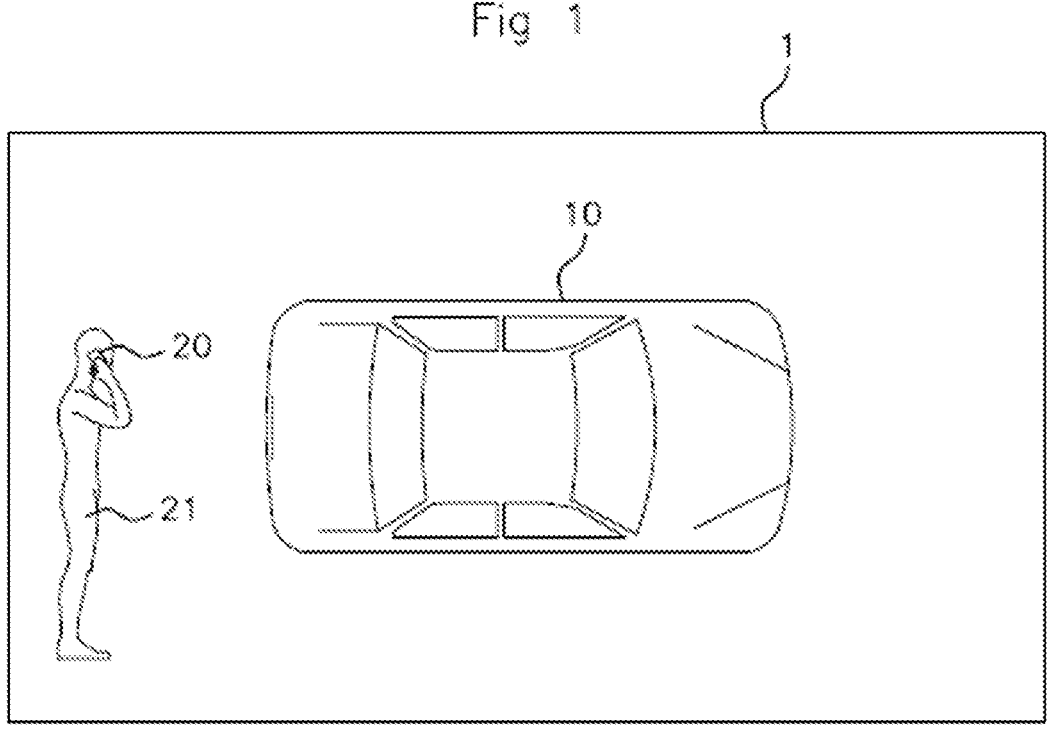
FIG. 1 schematically illustrates one embodiment of the system according to the invention.
Figure 2:
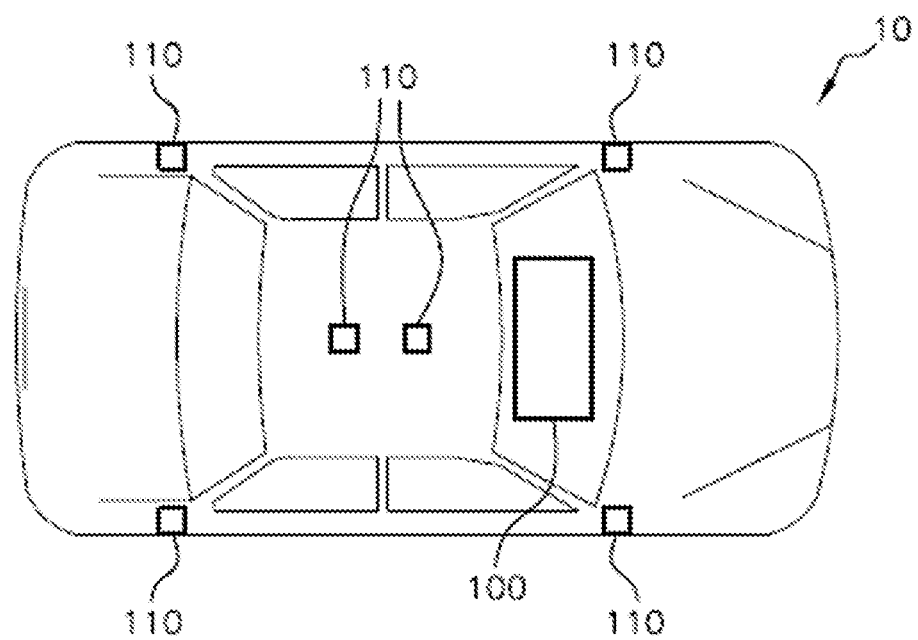
FIG. 2 schematically illustrates one embodiment of the vehicle according to the invention.

FIG. 1 shows one example of a system 1 according to an aspect of the invention and FIG. 2 shows one example of a vehicle 10 according to an aspect of the invention.

System 1

As illustrated in FIG. 1, the system 1 comprises a motor vehicle 10 and a communication device 20 borne by a user 21 of the vehicle 10.

Vehicle 10

With reference to FIG. 2, the vehicle 10 comprises an electronic control unit 100 and a plurality of transceivers 110.

In the example in FIG. 2, the transceivers 110 are six in number: four external transceivers 110, mounted in the bodywork or the doors of the vehicle 10, and two internal transceivers 110, mounted in the passenger compartment of the vehicle 10. In another embodiment, the number of transceivers 110 could be lower than or higher than six.

Each transceiver 110 is characterized by a single identifier.

Figure 3:
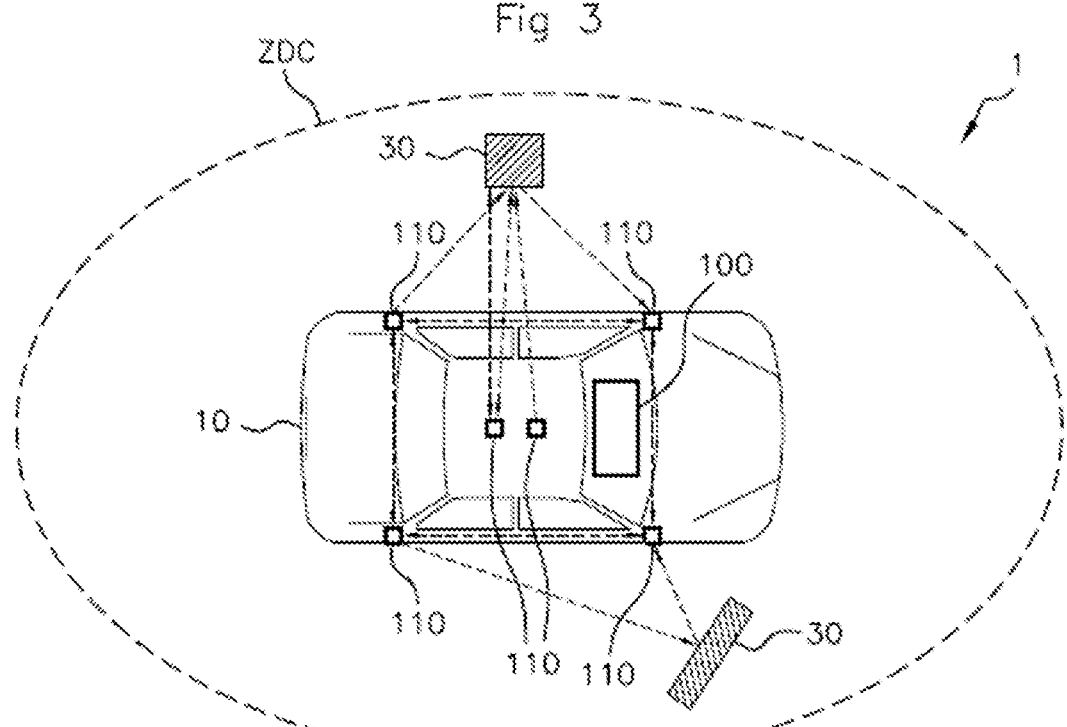
FIG. 3 schematically illustrates the vehicle of FIG. 2 in passive mode.
Figure 4:
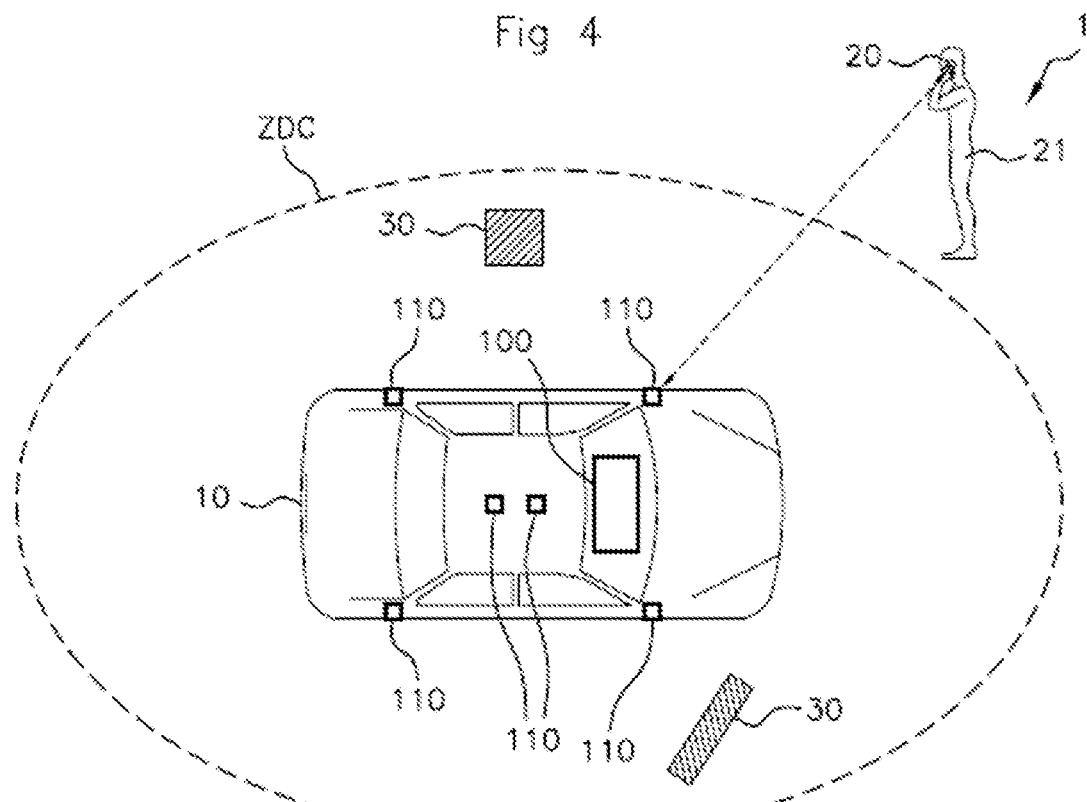
FIG. 4 schematically illustrates the vehicle of FIG. 2 in authentication mode.

Each transceiver 110 is configured, in a first mode, called the "passive" mode, to transmit detection signals and to receive reflected detection signals, the signals received by the transceiver 110 being signals transmitted thereby and/or by one of the other transceivers 110 and that been reflected by one or more obstacles (FIGS. 3 and 4). By obstacle 30, what is meant is a human being or object, especially the communication device 20. Detection signals transmitted by a transceiver 110 comprise the identifier of said transceiver 110.

Each transceiver 110 is configured, in a second mode, called the "active" mode, to communicate with the communication device 20. In other words, in this active mode, each transceiver 110 is configured to transmit communication signals to the communication device 20 and to receive communications signals sent by the communication device 20. The communication signals transmitted by a transceiver 110 comprise the identifier of said transceiver 110.

In the passive mode and in the active mode, each transceiver 110 is preferably configured to communicate, in a predetermined region around the vehicle 10, which is called the "detection and communication" region, using a single protocol, preferably the UWB protocol according to standard IEEE 802.15.4z (UWB standing for Ultra-WideBand).

The transceivers 110 and the communication device 20 communicate using frames coded in the signals.

Preferably, at least one of the transceivers 110 is further configured to communicate in Bluetooth® or BLE®, especially for example to authenticate the communication device 20, by emitting authentication-request signals and receiving therefrom authentication signals in a predetermined region, called the "authentication" region.

The Bluetooth® or BLE® coverage is in principle larger than the UWB coverage and hence the electronic control unit 100 will detect the approach of a communication device before it enters into the UWB coverage.

The electronic control unit 100 is configured to command the transmission of the detection signals and of the communication signals by the transceivers 110, to detect obstacles around the vehicle 10 and to communicate with the communication device 20, respectively.

The electronic control unit 100 is configured to process the reflected detection signals received by the transceivers 110 and the communication signals sent by the communication device 20 and received by the transceivers 110 in order to process them.

The electronic control unit 100 comprises a processor able to implement an instruction set allowing these functions to be performed.

Device 20

The communication device 20 is borne by the user 21 of the vehicle 10. The communication device 20 may for example be a smart phone, a smart card or a smart key.

The communication device 20 is characterized by a unique identifier in order to allow its authentication by the electronic control unit 100.

The communication signals transmitted by the communication device 20 comprise the identifier of said communication device 20.

Preferably, the communication device 20 is configured to communicate with the transceivers 110 using a UWB protocol according to the standards IEEE 802.15.4a and 802.15.4z (UWB standing for Ultra-WideBand).

Again preferably, the communication device 20 is configured to communicate with the transceivers 110 using a Bluetooth® or BLE® protocol, especially for example to allow it to be authenticated by the electronic control unit 100 through reception of authentication-request signals sent by at least one of the transceivers 110, and through transmission of authentication signals to the transceivers 110.

Example of Implementation

One embodiment of the method according to the invention will now be described with reference to FIGS. 3 to 8.

The method comprises three distinct phases: a preliminary phase P0 of detecting secondary obstacles 30 of the environment of the vehicle 1, a phase P1 of authenticating the communication device 20 and a phase P2 of locating the communication device 20 in the environment of the vehicle 1.

Preliminary Phase P0

The preliminary phase P0 may be carried out at any time and periodically, for example from the point when the vehicle 10 parks somewhere. This preliminary phase P0 allows the electronic control unit 100 to make an inventory of, i.e. detect, the secondary obstacles 30 situated in the environment of the vehicle 10. The secondary obstacles 30 may be fixed such as, for example, a post or a bin, or mobile such as, for example, a pedestrian, a cyclist, etc.

To this end, the transceivers 110 operate in passive mode and each transmit one or more detection signals to the predetermined detection and communication region ZDC around the vehicle 10. These detection signals are then reflected by detectable secondary obstacles 30 situated in the environment of the vehicle 10, in the predetermined detection and communication region ZDC around the vehicle 10.

With reference to FIG. 3, certain of the transceivers 110 then receive certain of the detection signals reflected by the obstacles 30 and identify the one or more transceivers 110 that transmitted them by virtue of the identifier contained in the signals.

Each transceiver 110 also receives, in a direct line, the detection signals transmitted by the adjacent transceivers 110.

Together, all of the signals received by each of the transceivers 110 in this preliminary phase P0 in passive mode allows the electronic control unit 100 to detect one or more secondary obstacles 30, which are called the "set of secondary obstacles", situated in the predetermined detection and communication region ZDC around the vehicle 10 and to determine, in a way known per se (multi-paths and time of flight), the distance between the vehicle 10 and each detected secondary obstacle 30, this allowing a "map" of the secondary obstacles 30 in terms of distance to be obtained.

This mapping phase may be carried out periodically by the vehicle 10 in order to determine the secondary obstacles 30 that are in the environment of the vehicle 10.

Preferably, this mapping phase is carried out with a minimum period of 50 milliseconds, to achieve a good compromise between the active mode and the passive mode. However, the period may be adjusted depending on the number of smart phones permitted to access the vehicle at the same time (for example shorter period in the case where there are few smart phones to manage, one or two for example, and longer period in the case where there are more smart phones to manage, more than two for example). The period may also be adjusted to allow for aspects related to power consumption or because the preliminary phase P0 can be initiated, by detection via the Bluetooth® or BLE® communication interface, at several tens of meters from the vehicle. In the latter case, for example, the period may be long when the user has just parked or is in the process of leaving the predetermined detection and communication region ZDC then short when outside the predetermined detection and communication region ZDC then again long when the smart phone of the user is detected via its Bluetooth® or BLE® communication interface.

Authenticating Phase P1

When a user of the vehicle 10 bearing the communication device 20 approaches the vehicle 10, the electronic control unit 100 will first detect it and authenticate it, for example via its Bluetooth® or BLE® communication interface in a way known per se.

As illustrated in FIG. 4, authentication may occur outside of the predetermined detection and communication region ZDC if the protocol used, Bluetooth® for example, has a larger area of coverage, the user then entering the area of UWB coverage of the vehicle 10.

Locating Phase P2

Figure 5:
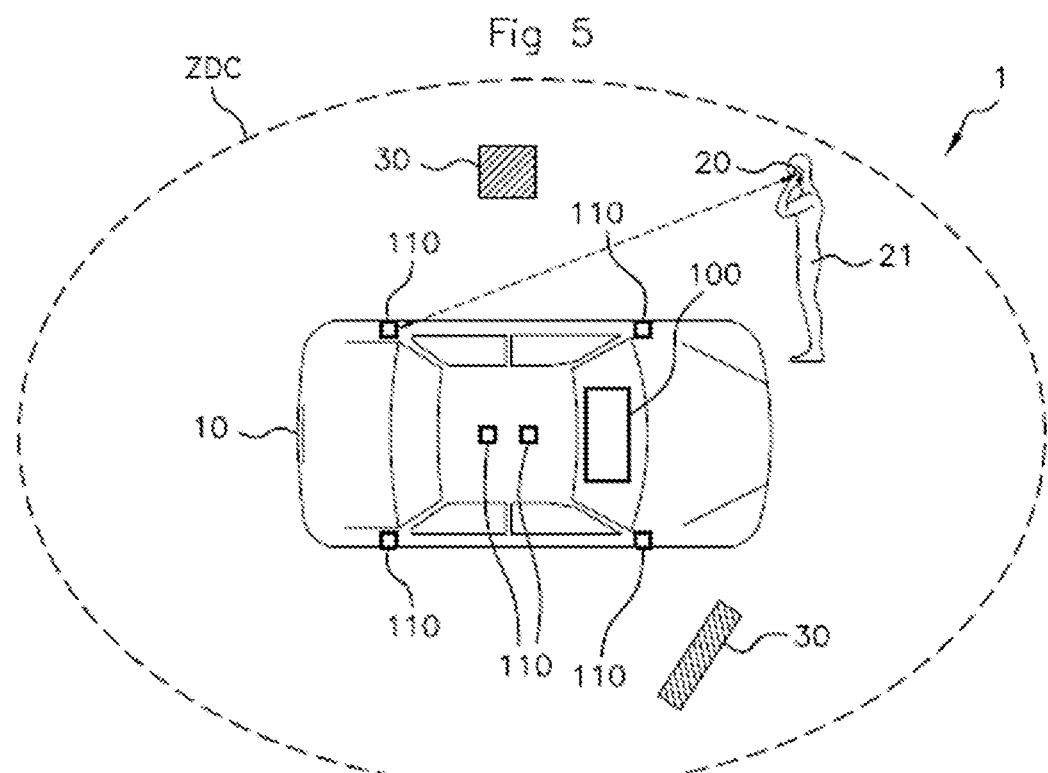
FIG. 5 schematically illustrates the vehicle of FIG. 2 in active mode.

With reference to FIG. 5, in order to locate the communication device 20 in the area of UWB coverage of the vehicle 10, which corresponds to the predetermined detection and communication region ZDC around the vehicle 10, the electronic control unit 100 firstly operates in active mode (step P21).

It will be noted that the predetermined detection and communication region ZDC could be different in passive mode and in active mode. Specifically, in passive mode (detection), the size of the region ZDC depends on the power level transmitted by the transmitters of the vehicle 10, on the sensitivity of the receivers of the vehicle 10, on the power reflected by the obstacle (adult, child) and on the distance to the obstacle. In active mode (communication), the size of the region ZDC depends on the sensitivity level of the receiver of the communication device 20, on the transmission power of the communication device 20, on the sensitivity level of the receivers of the vehicle 10, on the transmission power of the vehicle 10, and on the distance of the transceiver 110 of the vehicle 10 to the transceiver of the communication device 20. Given that in passive mode, the obstacle merely reflects some of the power incident thereon (it does not generate any power as the communication device 20 does in active mode), it may be expected that in general the region ZDC will be smaller in passive mode than in active mode (except in particular cases). It will be noted that this may also depend on the transceiver 110 of the vehicle 10 and on the way in which the communication device 20 is borne by the user 21. For example, the region ZDC could be larger in active mode than in passive mode for one transceiver 110 of the vehicle 10 and smaller for another transceiver 110 of the vehicle 10 at the same time.

To this end, the electronic control unit 100 commands transmission, by at least one of the transceivers 110, called the "communicating" transceiver(s), of a first communication signal in active mode to the communication device 20. This first communication signal is received by the communication device 20 which, on reception, commands transmission of a second communication signal to the communicating transceiver 110.

On reception by the communicating transceiver 110 of the second communication signal transmitted by the communication device 20, the electronic control unit 100 identifies the communication device 20 using its identifier, which is inserted into the second communication signal, then, knowing the average time taken to process the first communication signal by the communication device 20, computes the time between the transmission of the first communication signal by the communicating transceiver 110 and the reception of the second communication signal by the communicating transceiver 110. The electronic control unit 100, knowing the propagation speed of signals, then deduces therefrom the distance separating the vehicle 10 from the communication device 20 (step P22).

It will be noted that, as a variant, in addition to the time-of-flight information computed by the transceivers 110, each transceiver 110 may also send, in the communication frame, the processing time (processing-related time difference between the received frame and sent frame), to refine the distance computation.

Once the distance separating the vehicle 10 from the communication device 20 has been determined, the transceivers 110 operate in passive mode (step P23), in the same way as in the preliminary phase P0.

Figure 6:
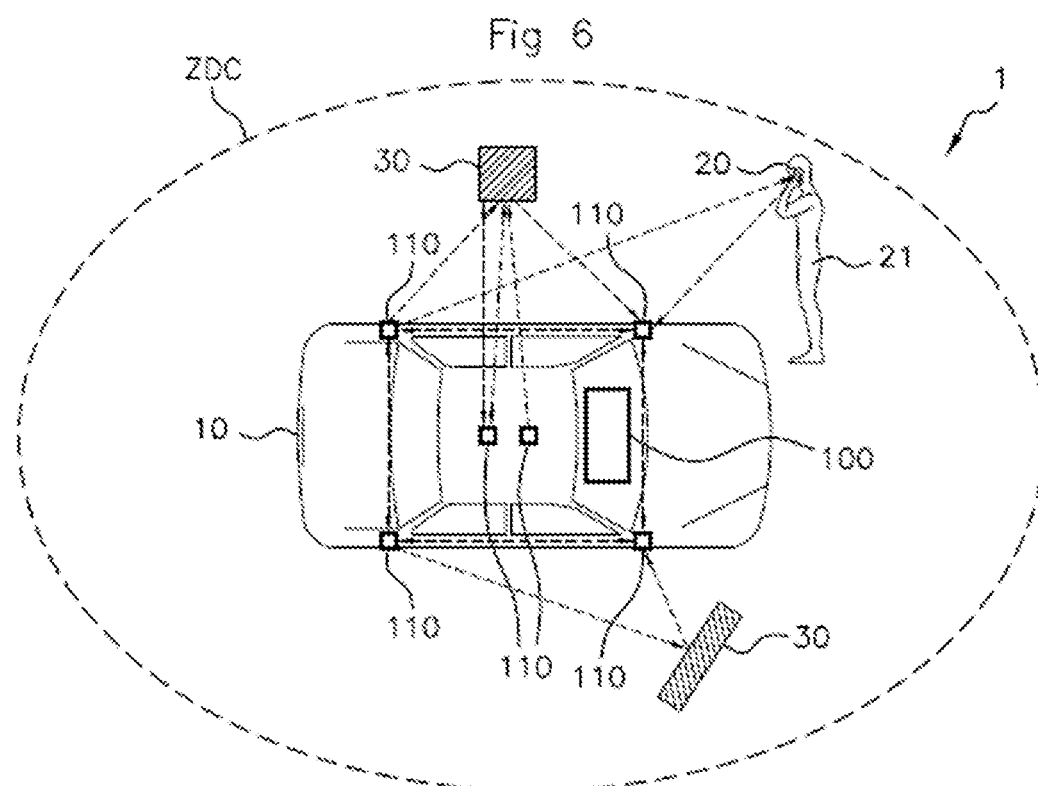
FIG. 6 schematically illustrates the vehicle of FIG. 2 in passive locating mode.

To this end, with reference to FIG. 6, each transceiver 110 transmits one or more detection signals to the predetermined detection and communication region ZDC around the vehicle 10 (i.e. to the area of UWB coverage of the vehicle 10). These detection signals are then reflected by the detectable obstacles 30 situated in said predetermined region. Certain of the transceivers 110 then receive certain of the detection signals reflected by the obstacles 30 and identify the one or more transceivers 110 that transmitted them by virtue of the identifier contained in the signals.

Each transceiver 110 also receives, in a direct line, the detection signals transmitted by the adjacent transceivers 110.

Together, all of the signals received by each of the transceivers 110 in this locating phase in passive mode allows the electronic control unit 100 (step P24):

a.—to detect a set of obstacles, called "current" obstacles, said set of current obstacles comprising the communication device 20 borne by the user 21 and/or potentially the user 21 himself, and the secondary obstacles 30 still present in the environment of the vehicle 10, b.—to determine, in a way known per se (multi-path and time of flight), the distance between the vehicle 10 and each detected obstacle 30, this allowing a "map" of the current obstacles 20, 21, 30 in terms of distance at the given time to be obtained.

By comparing the distance of the current obstacles 20, 21, 30, that was determined during the preliminary phase P0 in passive mode and the distance of the communication device 20 that was determined in active mode, the electronic control unit 100 may eliminate all the objects detected in locating phase P2 that are not at the distance computed for the communication device 20 and thus identify the communication device 20 among the current obstacles (step P25). The electronic control unit 100 will especially identify the secondary obstacles 30 that were detected in the preliminary phase P0, even if the secondary obstacles 30 have moved in the environment, as said obstacles will effectively have a tendency to move away from the vehicle 10 rather than to get closer thereto, unlike the communication device 20, and in view of the fact that the secondary obstacles 30 will be at distances that do not correspond to that of the communication device 20.

If the communication device 20 and one or more other obstacles 30 are found at the same distance, the echo from the secondary obstacle 30 will be mixed up with the echo of the person bearing the smart phone but, as the user 21 is moving with a speed of movement and approach different from a secondary obstacle, the signal processing will allow the two obstacles to be discriminated between.

Next, the electronic control unit 100 determines the location of the communication device 20 (step P26).

Figure 7:
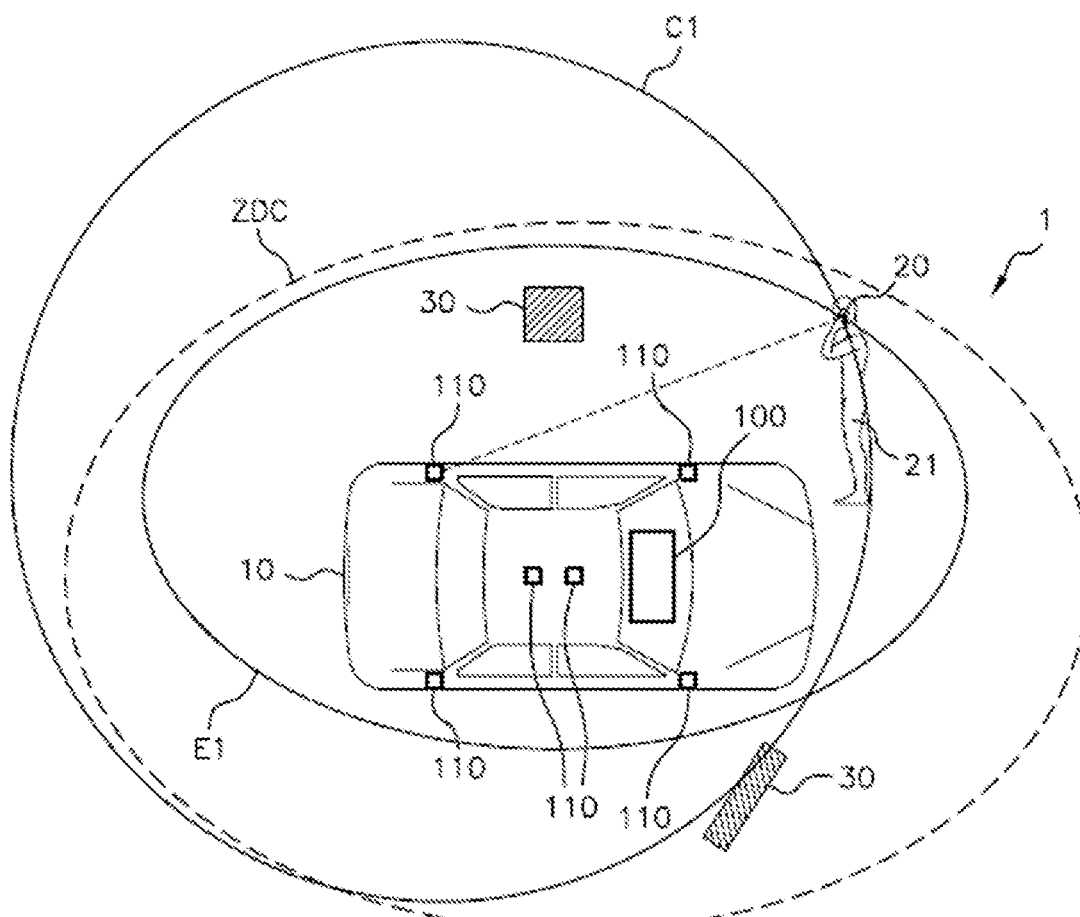
FIG. 7 schematically illustrates the vehicle of FIG. 2 during location.
Figure 8:
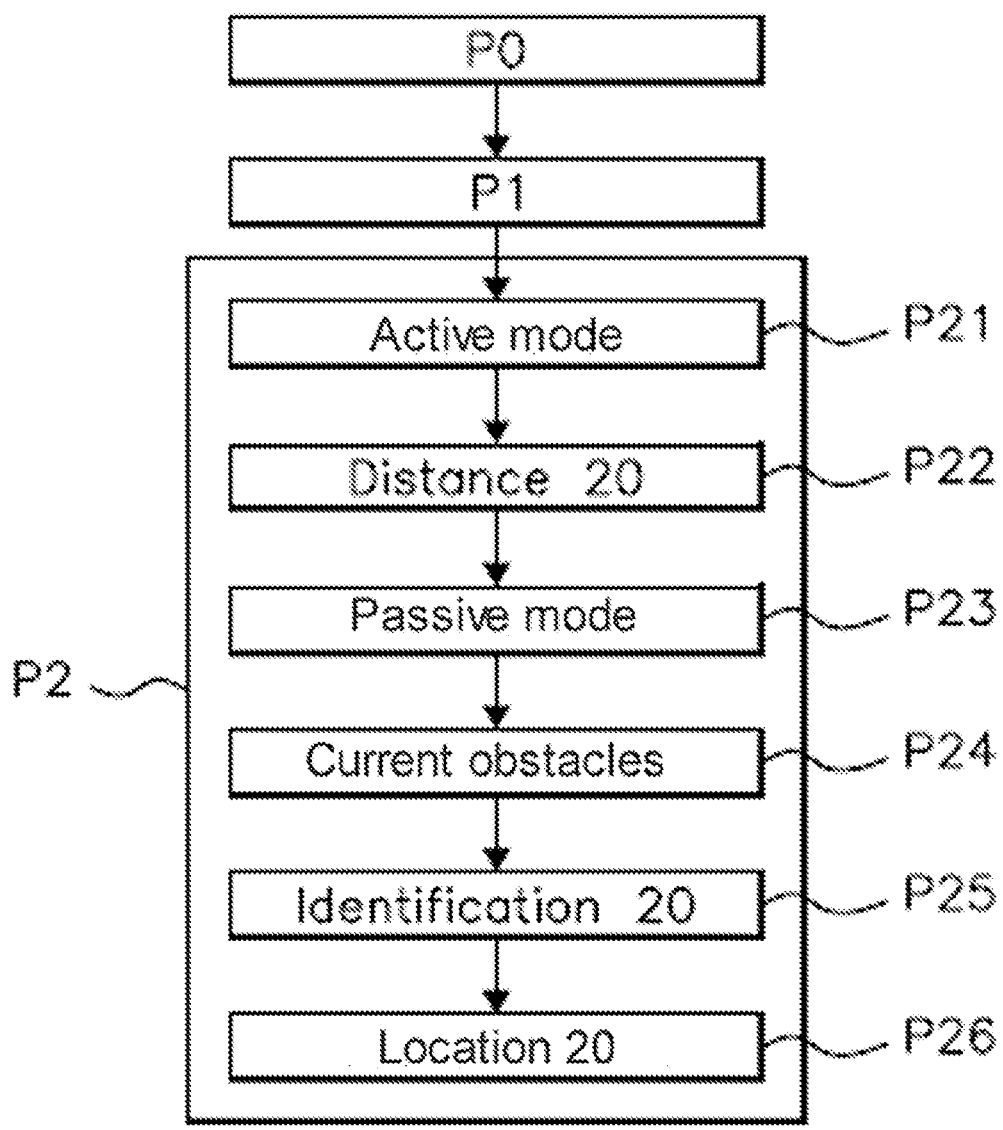
FIG. 8 schematically illustrates one embodiment of the method according to the invention.

With reference to FIG. 7, the communication device 20 is found on a circle C1 the center of which is positioned on the communicating transceiver 110 and the radius of which is equal to the computed distance separating the vehicle 10 from the communication device 20.

The communication device 20 is also found on an ellipse E1 the focal points of which are defined by the communicating transceiver 110 and a transceiver 110 that received the reflected signals transmitted by the communicating transceiver 110.

The circle C1 and the ellipse E1 cross at two points, and the location of the communication device 20 therefore consists in determining which of these two points corresponds to the communication device 20.

Since the communication device 20 is outside of the vehicle 10 at this stage, only two cases need be considered: both points are situated outside of the vehicle 10 or else one of the points is situated outside of the vehicle 10 and the other point is situated in the passenger compartment of the vehicle 10. In the latter case, the point situated outside of the vehicle 10 corresponds to the communication device 20.

In the case where both points are situated outside of the vehicle 10, the electronic control unit 100 may then verify which transceivers 110 received the signals reflected by the communication device 20, to deduce therefrom on which side of the vehicle 10 the communication device 20 is found and thus eliminate the point of intersection furthest off.

In the case where, subsequently, the communication device 20 is found in the passenger compartment and the locating phase P2 is repeated, the electronic control unit 100 will possibly determine that the communication device 20 is found in the passenger compartment if one of the transceivers 110 found in the passenger compartment received the signals reflected by the communication device 20 and deduced therefrom that the communication device 20 was found in the passenger compartment, or was capable of locating the communication device 20 inside the vehicle 10 using the active mode.

In one embodiment, the communication signals and the detection signals could be the same signals in the locating phase P2, i.e. in the locating phase P2, the active mode and the passive mode could be implemented simultaneously using the same signals that would thus serve both to communicate with the communication device 20 and to detect the current obstacles 20, 21, 30.

An aspect of the invention therefore allows the communication device 20 to be located when a single transceiver 110 is visible to said communication device 20 in active mode and when only two transceivers 110 are visible in passive mode.

The invention claimed is:

1. A method for locating a communication device borne by a user in proximity to a vehicle in order to trigger at least one function of said vehicle, the vehicle comprising at least two transceivers each configured to transmit and receive signals in a first mode, called a "passive" mode, in which the signals received by one of the transceivers are signals transmitted by one of the transceivers that have been reflected by an obstacle, and a second mode, called an "active" mode, in which the transceiver is configured to communicate with the communication device borne by the user, said method comprising:
in a preliminary phase, detection of a predetermined set of secondary obstacles comprising obstacles present in the environment of the vehicle before the arrival of the communication device, said detection comprising determination of predetermined distances between the vehicle and the secondary obstacles in the passive mode; and
in a locating phase:
set up of a communication in the active mode between the vehicle, via at least one of the transceivers, called the "communicating" transceiver, and the communication device;
determination of the distance between said communicating transceiver and the communication device on the basis of the communication signals exchanged during the communication in the active mode;
transmission of detection signals in the passive mode by at least one of the transceivers;
detection of a set of obstacles, called "current" obstacles, on the basis of the transmitted detection signals, said set of current obstacles comprising at least the communication device borne by the user, said detection comprising determination of the distance between the vehicle and each obstacle of said set of current obstacles;
identification of the communication device among the current obstacles by comparing the distance between the communicating transceiver and the communication device determined in the active mode and the distances between the vehicle and each obstacle of the set of current obstacles determined in the passive mode; and
location of the identified communication device among the obstacles of the set of obstacles on the basis of the determined distance and of the positions of the at least one transceiver that transmitted the detection signals in passive mode and of the at least one transceiver that received the detection signals reflected by the communication device in passive mode.

2. The method as claimed in claim 1, wherein the communication in active mode further comprises:
transmission, by at least one of the transceivers, called the "communicating" transceiver(s), of a first communication signal in active mode to the communication device,
reception by the communication device of the transmitted first communication signal,
transmission by the communication device of a second communication signal to the communicating transceiver,
reception by the communicating transceiver of the transmitted second communication signal,
identification of the communication device.

3. The method as claimed in claim 1, wherein the distance is determined in active mode by computing the time, called the "time of flight", between the transmission of the first communication signal and the reception of the second communication signal by the communicating transceiver or using the power or the phase of the signals received from the communication device.

4. The method as claimed in claim 1, wherein the passive mode comprises:
transmission of at least one detection signal in the passive mode by each of the transceivers, the at least one detection signal comprising the identifier of said transceiver,
reflection of the at least one detection signal from at least one obstacle,
reception of the at least one reflected detection signal by at least one of the transceivers that is not the communicating transceiver.

5. The method as claimed in claim 4, wherein the distance between the vehicle and an obstacle is computed using the time-of-flight or the power or the phase of the signals reflected from said obstacle.

6. The method as claimed in claim 1, wherein the preliminary phase of determining the predetermined set of secondary obstacles comprises transmission of the at least one detection signal in the passive mode by each of the transceivers and detection of a set of obstacles on the basis of the signals received by at least one of the transceivers in the passive mode.

7. The method as claimed in claim 1, comprising a step of detection of the communication device in the environment of the vehicle.

8. A computer program product, comprising a set of program code instructions that, when they are executed by one or more processors, configure the one or more processors to implement the method as claimed in claim 1.

9. An electronic control unit for a motor vehicle, said electronic control unit being configured to implement the method as claimed in claim 1.

10. A motor vehicle comprising an electronic control unit as claimed in claim 9.

* * * * *